United States Patent Office 3,429,379
Patented Feb. 25, 1969

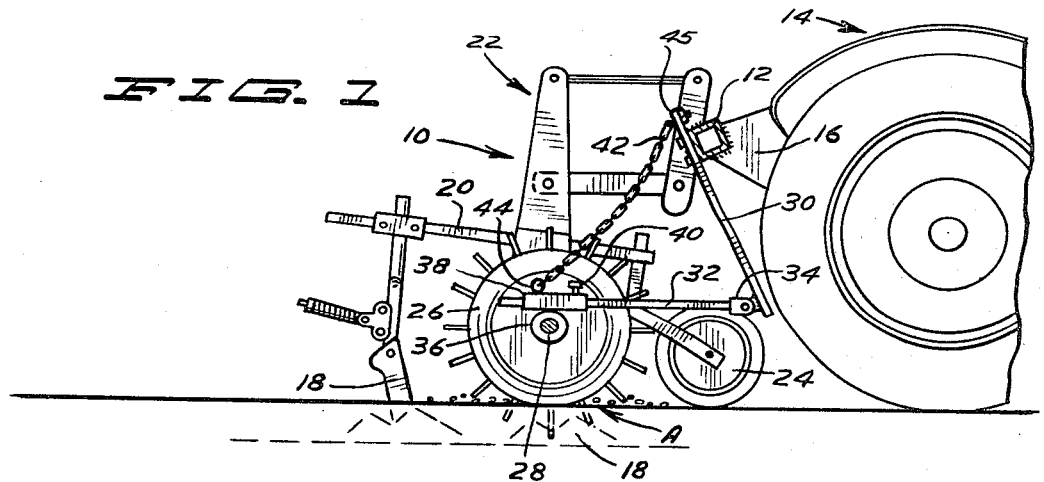
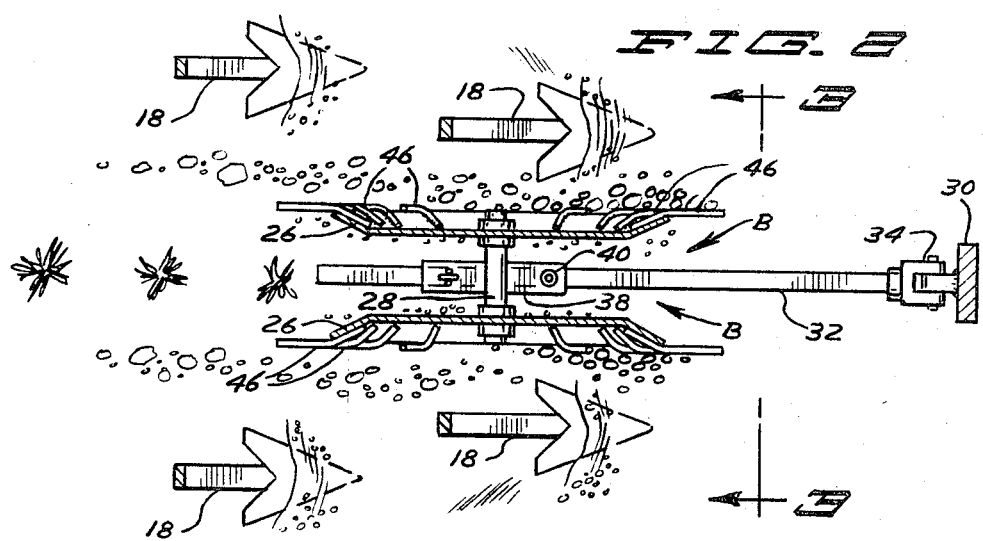
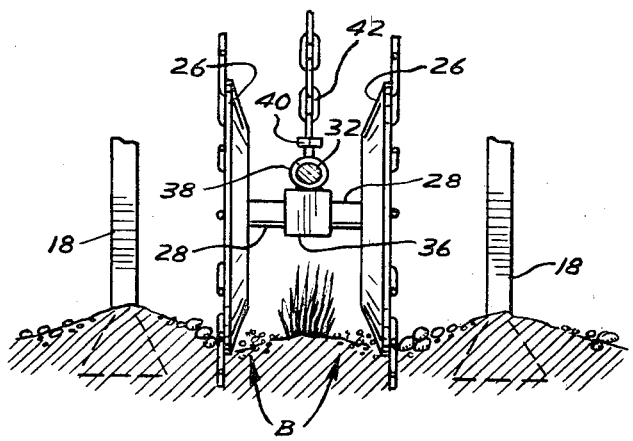
INVENTOR.
JOHN A. TEBBEN

3,429,379
CULTIVATOR SHIELD
John A. Tebben, Clara City, Minn. 56222
Filed Oct. 20, 1965, Ser. No. 498,317
U.S. Cl. 172—510                    1 Claim
Int. Cl. A01b 17/00

ABSTRACT OF THE DISCLOSURE

A pair of rotary dished discs are set to roll on each side of the row being cultivated. Angular tines are formed with one portion which is welded to the disc with which it is associated and has a second portion disposed radially. The tines allow finer dirt to pass in front of the discs and then around the plants in the row during the cultivation.

---

This invention relates to the art of row crop cultivation. More particularly, the invention relates to a shield or fender for use in a row crop cultivator for protecting the plants and preventing their being covered or otherwise damaged by the soil thrown laterally by the cultivator sweeps.

For economic reasons, modern tractor cultivators are generally operated at relatively high speeds and the shape and size of the cultivator sweeps are designed such that excessive amounts of soil are not thrown to the side by the sweeps as they pass through the ground. Nevertheless, a certain amount of soil is in fact thrown toward the plants, and, therefore, some means of preventing injury to the plants is normally required. In the early part of the growing season, it is desirable to prevent any quantity of dirt from passing into the row so that the young plants are not covered. However, later in the season when the crop plants are more mature, it is the practice of some farmers to allow a certain amount of finer soil to sift over the weeds in the plant row to smother them. Of course, this is done when the plants of the crop are sufficiently mature so that they will not be covered as well.

It is an object of the present invention to provide an improved shield for use with a tractor cultivator which is operated at a relatively high speed.

It is another object of this invention to provide a cultivator shield which is rugged in construction and reliable in operation, and which is capable of adjustment so that it may be positioned to allow small amounts of finer soil to flow around the plants in the row.

Briefly described, the shield according to the invention comprises a pair of rotary discs which are set to roll on each side of the row which is being cultivated. Radial tines on the discs engage the ground to assist the rolling action and, when desired, these tines allow finer dirt, but not clods, to pass in front of the discs and then around the plants in the row. The discs are supported on a frame structure which is attached to an otherwise conventional cultivator, and the position of the discs with respect to the cultivator sweeps can be adjusted to block the flow of dirt entirely or to permit the finer dirt to flow over the weeds in the row as mentioned above.

Other objects, advantages and new features of the present invention will become apparent from a reading of the following detailed description when taken in conjunction with the accompanying drawing wherein:

FIGURE 1 is a partial elevational view of a tractor cultivator, illustrating one possible orientation of the shield of the present invention to the cultivator sweeps;

FIGURE 2 is a top plan view, partly in section, showing the disposition of the shield discs on opposite sides of the row; and FIGURE 3 is a partial elevational view taken in the direction of the arrows 3—3 in FIGURE 2.

In the illustrated embodiment of the invention, the cultivator shield is shown in conjunction with a tractor cultivator 10. Conventionally, such cultivators have a transverse mounting bar 12 attached to a tractor 14 as by means of a suitable bracket 16. The cultivator shovels or sweeps are indicated at 18 in the drawings and are adjustably mounted on a shaft 20 connected to the mounting bar 12 by means of a parallelogram linkage 22. A suitable gauge wheel 24 is employed to hold the assembly in position such that the sweeps will enter the ground to the desired depth. It will be understood by those skilled in the art that several sets of sweeps 18 are mounted on the bar 12 to run in the spaces between the rows to stir the soil in those spaces and thus uproot, smother and otherwise deter the growth of weeds.

The actual shielding elements of the present invention are the discs 26. As best illustrated in FIGURE 2, the discs 26 are of shallow dish-shaped configuration in cross section, this construction imparting an outward thrust to the soil which falls against the disc as the soil passes off the discs at the rear. The discs 26 are mounted in spaced relation on an axle 28 and are arranged to lie on opposite sides of the row which is being cultivated, as shown.

For connecting the discs 26 to the mounting bar 12, a bracket 30 is attached to the bar 12 and extends downwardly to a position which lies forward of the desired position of the discs 26. A draw-bar 32 is pivotally connected to the bracket 30 as indicated at 34, and the discs 26 are adjustably mounted on the draw-bar 32.

The connection of the discs 26 to the draw-bar 32 is such as to permit fore and aft adjustment of the discs with respect to the forward direction of the cultivator. Thus, the axle 28 is journaled in a block 36 which is rigidly attached to a sleeve 38 in surrounding relation to the draw-bar 32. A set screw 40 is provided for locking the sleeve 38 in any desired position along the draw-bar 32.

Completing the supporting mechanism for the discs 26 is a lift chain 42 which is connected between a suitable ring 44 on the sleeve 38 and any suitable fixed portion of the machine, such as the upper end 45 of the bracket 30, so that the discs may pivot around the hinge 34 to follow minor variations in the ground surface, but can be raised clear of the ground whenever desired.

It will be apparent from the above description, that the discs 26 will roll along the surface of the ground as the cultivator proceeds forwardly. In order to aid in this rolling action, a plurality of radial tines 46 are mounted on each of the discs 26 so as to extend a predetermined distance beyond the edge of the discs. The tines 46 are secured to the surfaces of the discs 26 in any desired manner, as by welding, and are preferably bent over the rim of the disc as shown so that the portions thereof which lie outwardly of the peripheral edge of the discs have their axes disposed in a common plane at right angles to the rotation axis of the discs.

In the operation of the present invention early in the growing season, the position of the sleeve 38 on the draw-bar 32 is adjusted so that the soil thrown toward the row by those of the sweeps 18 which lie closest to the row would be completely intercepted by the discs 26. The sweeps which are positioned farther from the row are no problem, because they do not throw dirt far enough to the side to endanger the plants.

Later in the growing season when the plants of the crop have achieved a larger size, it is desirable to allow a certain amount of finer dirt to be moved into the row and around the bases of the plants to cover and smother the smaller weeds which have grown up since the previous cultivation. For this purpose, the set screw 40 would be loosened and the sleeve 38 moved backwardly with respect to the position of the sweeps 18 nearest the row. The discs are thus positioned such that a certain amount of the soil which is moved laterally by the sweeps 18 will fall in the zone indicated at A in FIGURE 1, that is, just forwardly of the discs in the region of the tines 46. The finer portions of this soil will then sift through the tines 46 into the zone labeled B in FIGURES 2 and 3, which indicates the zone of a row of plants. Clods and coarser soil are still prevented from entering the row, however.

It should be pointed out also that the fore and aft adjustability of the position of the discs 26 is of particular advantage in adapting the device for use by different farmers. The speed at which a cultivator is operated is a matter of preference, so that wide variations exist in the amount of soil which is thrown laterally by the cultivator sweeps. Thus, where the slower speeds are involved and less dirt is thrown to the side by the cultivator sweeps, the sleeve 38 may be positioned quite far back on the draw-bar 32 in order to permit the finer dirt to pass through to the plant row. At the higher speeds preferred by some farmers, the discs can be positioned more forwardly in order to be in the proper position to intercept the larger clods and quantities of dirt.

It should now be apparent that a cultivator shield has been described which fully meets the objectives of the invention set forth above. In particular, a highly versatile rotary cultivator shield has been described which is quickly adaptable to a variety of needs.

It is to be understood that within the scope of the appended claim, the invention may be practiced otherwise than as herein specifically described.

I claim:
1. A rotary cultivator shield, adapted for attachment to a row crop cultivator having a transverse mounting bar and a plurality of cultivator elements adapted to work the soil on both sides of a row, comprising a pair of dished discs having outwardly facing concave surfaces, each disc having a central flat section residing in one plane and a peripheral edge in a plane offset therefrom to provide an angled intermediate portion between said flat section and said peripheral edge, journal means for supporting said discs for rotation about a common axis and in spaced relation, means for mounting said journal means on said mounting bar in position to dispose said discs on opposite sides of said row, and a plurality of tines each having first and second portions forming an obtuse angle, said first portions being secured to the intermediate portion of each disc, and said second portions extending radially ouwtardly a predetermined distance from the respective disc peripheral edge, the second tine portions for each disc having their axes disposed in a common plane at right angles to said common axis.

References Cited

UNITED STATES PATENTS

| 1,351,704 | 8/1920 | Starch | 172—513 |
| 2,329,794 | 9/1943 | Speck | 172—177 |
| 2,624,259 | 1/1953 | Greiman | 172—510 X |
| 2,718,185 | 9/1955 | Shawd | 172—510 |
| 3,247,911 | 4/1966 | Erickson | 172—510 |

ABRAHAM G. STONE, *Primary Examiner.*

J. R. OAKS, *Assistant Examiner.*